B. BALDWIN.
RING SLOT CLEANING TOOL.
APPLICATION FILED MAR. 22, 1921.
1,416,673.  Patented May 23, 1922.
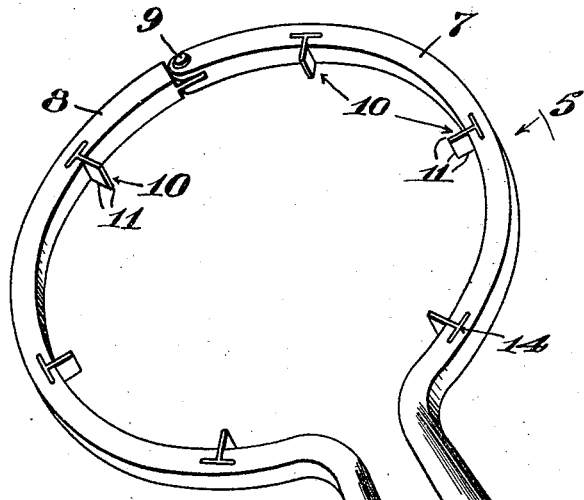
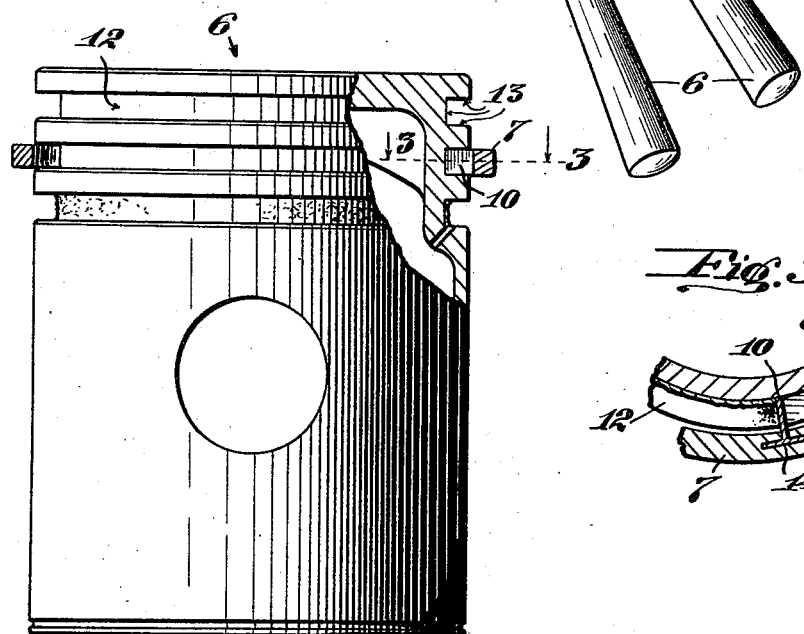
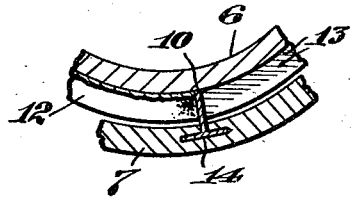
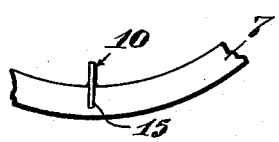
INVENTOR
Bernard Baldwin.
By R. S. Berry,
Attorney.

UNITED STATES PATENT OFFICE.

BERNARD BALDWIN, OF LOS ANGELES, CALIFORNIA.

RING-SLOT-CLEANING TOOL.

1,416,673.  Specification of Letters Patent.  Patented May 23, 1922.

Application filed March 22, 1921. Serial No. 454,596.

*To all whom it may concern:*

Be it known that I, BERNARD BALDWIN, a citizen of the United States, residing at Los Angeles, in the county of Los Angeles and State of California, have invented new and useful Improvements in Ring-Slot-Cleaning Tools, of which the following is a specification.

This invention relates to a ring groove cleaning tool.

The purpose of my invention is to provide a device for scraping and cleaning annular grooves such as those provided in the pistons of internal combustion engines to receive the piston rings, and an object of my invention is to provide a device adapted to encompass a piston and provided with a plurality of scrapers adapted to extend into the ring grooves so that by oscillating the device the ring grooves may be scraped clean of carbon and other foreign substances.

A further object of the invention is to provide a device of the character described that is particularly adapted to economical manufacture, especially by the die-casting method, and in which the scrapers may be formed separately to facilitate manufacture as well as repair and replacement.

Other objects will appear hereinafter.

The invention is illustrated by the accompanying drawings, in which:

Figure 1 is a view in perspective of a device embodying the features of the invention.

Figure 2 is a view in elevation of a piston showing a portion broken away, illustrating the application of the device in the operation of removing carbon and other deposits from the ring groove of the piston.

Figure 3 is a view in section as seen on the line 3—3 of Figure 2 looking in the direction of the arrows illustrating the scrapers in removing carbon from the ring grooves.

Figure 4 is a view in elevation of a modification of the invention.

More specifically 5, indicates an expandible ring which may be of any suitable material or construction adapting it to be expanded to encompass a piston 6, but which is here shown as comprising two semicircular or segmental sections 7 and 8 respectively pivoted together by means of a pin 9 which allows of the two sections being advanced to pass over a piston and then retracted to closely encompass the piston.

This ring is provided on its inner periphery with a plurality of radially disposed rectangular scrapers 10, having three scraping edges 11 adapted to enter the ring grooves 12 of the piston and contact practically simultaneously with the three margins 13 of the groove. The ring grooves 12 are of rectangular cross section, and as the scrapers are rectangular their edges will conform to the surfaces of the grooves and their corners will extend into the corners of the grooves, so that the scrapers will act throughout the sides and bottom of the groove in operating the tool. The scrapers may be formed upon the ring in any suitable manner but in the form of the invention illustrated in Figure 1 the scrapers are shown as of T-form and adapted to be pressed into corresponding openings 14 provided in the ring sections so that the head portions of the scrapers will be anchored in the ring and the stem portions projecting from the inner face of the ring, this construction adapting itself to manufacture by die-casting and permitting of the scrapers being made of a different material than the ring and also permitting of the scrapers being separately tempered or otherwise treated.

In the form of the invention shown in Figure 4 these scrapers are of straight section and forced directly into radial slots 15, provided for this purpose.

The ring sections 7 and 8 are formed with handles 16 extending outward from the ends of the two sections opposite the pivotal connection between the sections, which handles are of suitable design to permit of their being held together by the operator's hand to give varying pressures.

In the operation of the invention the ring sections 7 and 8 are swung outwardly on their pivotal connection 9 and placed astride the piston 6 and are then brought toward each other to dispose the scrapers 10 within the ring groove 12 to be cleaned. The tool is then manipulated in such manner as to cause the scraper to act on the deposit carried by the several walls of the ring groove and effect a scraping action, so as to remove the deposit; the tool being either oscillated or rotated to advance the series of scrapers along the groove. The scrapers may be caused to bear against the surfaces acted on at various pressures according to the pressure exerted on the handle 6 by the operator; the handles being so spaced apart as to be readily grasped in the hand and pressed toward each other.

While I have shown and described a specific embodiment of my invention, I do not limit myself to the exact details of construction shown, but may employ such other constructions and modifications as occasion may require coming within the scope of the appended claims without departing from the spirit of the invention.

I claim:

1. In a tool of the character described, a pair of pivotally connected segments having T-slots formed therein and opening to their inner surfaces, and T-shaped blades inserted in said slots having rectangular portions projecting from the inner faces of the segments.

2. In a tool of the character described, a pair of segmental sections pivotally connected together adapted to encompass a piston, and a series of spaced scrapers projecting from the inner peripheries of said sections, each of said scrapers comprising a rectangular member projecting transversely of the section and presenting a flat face in the direction of length of the segment and adapted to extend into and conform to a ring groove of rectangular cross section and formed with a scraping edge on each side thereof and on its inner end to contact the sides and bottom of a groove throughout.

BERNARD BALDWIN.